(12) United States Patent
Jun et al.

(10) Patent No.: US 8,199,700 B2
(45) Date of Patent: Jun. 12, 2012

(54) SYSTEM AND DATA EXCHANGING METHOD FOR INTERWORKING WIRELESS LAN AND PORTABLE INTERNET

(75) Inventors: Sun-Mi Jun, Daejeon (KR); Kyung-Soo Kim, Daejeon (KR); Jee-Hwan Ahn, Davis (KR); Song-In Choi, Daejeon (KR); Dong-Soo Jung, Daejeon (KR); Byoung-Chun Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 875 days.

(21) Appl. No.: 11/926,437

(22) Filed: Oct. 29, 2007

(65) Prior Publication Data

US 2008/0130575 A1 Jun. 5, 2008

(30) Foreign Application Priority Data

Dec. 1, 2006 (KR) .................. 10-2006-0120742
Apr. 11, 2007 (KR) .................. 10-2007-0035628

(51) Int. Cl.
*H04W 4/00* (2009.01)
*H04L 12/28* (2006.01)
(52) U.S. Cl. .................. 370/328; 370/401; 455/426.1
(58) Field of Classification Search .................. None
See application file for complete search history.

(56) References Cited

U.S. PATENT DOCUMENTS

| | | | | |
|---|---|---|---|---|
| 7,715,853 | B1 * | 5/2010 | Frerking et al. | 455/456.4 |
| 2005/0037751 | A1 * | 2/2005 | Kim et al. | 455/432.1 |
| 2005/0282492 | A1 * | 12/2005 | Lopez | 455/12.1 |
| 2006/0019669 | A1 * | 1/2006 | Moon et al. | 455/447 |
| 2006/0052099 | A1 * | 3/2006 | Parker | 455/426.1 |
| 2006/0094401 | A1 * | 5/2006 | Eastlake | 455/411 |
| 2006/0098614 | A1 * | 5/2006 | Moon et al. | 370/338 |
| 2006/0203778 | A1 * | 9/2006 | Han et al. | 370/335 |
| 2006/0209882 | A1 * | 9/2006 | Han et al. | 370/465 |
| 2006/0223526 | A1 * | 10/2006 | Qi et al. | 455/432.1 |
| 2006/0276189 | A1 * | 12/2006 | Kiernan et al. | 455/436 |
| 2007/0011604 | A1 * | 1/2007 | Chiu | 715/513 |

(Continued)

FOREIGN PATENT DOCUMENTS

KR 2003-0071981 9/2003

(Continued)

OTHER PUBLICATIONS

Korean Office Action (Apr. 23, 2008).

*Primary Examiner* — Clemence Han
(74) *Attorney, Agent, or Firm* — Kile Park Goekjian Reed & McManus PLLC

(57) ABSTRACT

The present invention relates to an interworking device for interworking with a first network and exchanging data between a second network and a terminal device. The interworking device establishes a first wireless data path with the first network, and receives a first network address from an address allocation server of the first network through the first wireless data path. In addition, the interworking device establishes a second wireless data path with the terminal device, receives a second network address from an address allocation server of the second network through the second wireless data path, and transmits the second network address to the terminal device. Subsequently, the interworking device establishes a tunnel that passes through the first network and is accessed to the second network, and exchanges data with the second network.

7 Claims, 10 Drawing Sheets

U.S. PATENT DOCUMENTS

| | | | |
|---|---|---|---|
| 2007/0021119 A1* | 1/2007 | Lee et al. | 455/436 |
| 2007/0025297 A1* | 2/2007 | Lee et al. | 370/331 |
| 2007/0109991 A1* | 5/2007 | Bennett | 370/328 |
| 2007/0159992 A1* | 7/2007 | Kim | 370/311 |
| 2007/0160017 A1* | 7/2007 | Meier et al. | 370/338 |
| 2007/0232358 A1* | 10/2007 | Sherman | 455/560 |
| 2007/0268846 A1* | 11/2007 | Proctor et al. | 370/279 |
| 2008/0102843 A1* | 5/2008 | Todd et al. | 455/445 |
| 2008/0112362 A1* | 5/2008 | Korus | 370/331 |
| 2008/0112363 A1* | 5/2008 | Rahman et al. | 370/331 |
| 2009/0149157 A9* | 6/2009 | Gallagher et al. | 455/414.1 |
| 2010/0262920 A1* | 10/2010 | Tischer et al. | 715/745 |

FOREIGN PATENT DOCUMENTS

| | | |
|---|---|---|
| KR | 10-2006-0000830 | 1/2006 |
| KR | 10-2006-0032544 | 4/2006 |
| KR | 10-2006-0097725 | 9/2006 |
| WO | 2005039114 | 4/2005 |

* cited by examiner

SYSTEM AND DATA EXCHANGING METHOD FOR INTERWORKING WIRELESS LAN AND PORTABLE INTERNET

CROSS-REFERENCE TO RELATED APPLICATION

This application claims priority to and the benefit of Korean Patent Application No. 10-2006-0120742 filed in the Korean Intellectual Property Office on Dec. 1, 2006, and 10-2007-0035628 filed in the Korean Intellectual Property Office on Apr. 11, 2007, the entire contents of which are incorporated herein by reference.

BACKGROUND OF THE INVENTION (a) Field of the Invention

The present invention relates to an apparatus for providing an Internet service and a method thereof. Particularly, the present invention relates to an apparatus for providing an Internet service to a wireless local area network terminal and a method thereof.

This work was supported by the IT R&D program of MIC/IITA[2006-S-009-01, The Development of WiBro Service and Operating Standard].

(b) Description of the Related Art

A wireless local area network (WLAN) for providing a wireless Internet service is required to include a WLAN terminal, a WLAN access point (AP) accessed to the WLAN terminal through a wireless link, and the Internet accessed to the wireless AP through wires. In this case, the Internet includes an authentication, authorization, accounting (AAA) server for authenticating a WLAN subscriber, and a dynamic host configuration protocol (DHCP) server for allocating an Internet protocol (IP) address to the authenticated subscriber.

In the wireless Internet service provided by the WLAN, there is a merit in that a high speed Internet service of high transmission speed and low packet loss is provided, but there is a problem in that the service may only be received within a coverage of the WLAN AP and not in a moving state.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for providing a wireless Internet service to a WLAN terminal in an area deviated from the coverage of a WLAN AP.

According to an exemplary embodiment of the present invention, in a method for interworking with a first network to exchange data between a second network and a terminal device, a first wireless data path that follows a first wireless communication protocol is established with the first network, a first network address is received from an address allocation server of the first network through the first wireless data path, a second wireless data path that follows a second wireless communication protocol is established with the terminal device, a second network address is received from an address allocation server of the second network through the first wireless data path, the second network address is transmitted to the terminal device through the second wireless data path, a tunnel that passes through the first network and is accessed to the second network is established, and the data are exchanged with the second network through the tunnel.

In this case, the first wireless communication protocol supports a handover operation, and the second wireless communication protocol does not support the handover operation.

In addition, in the exchanging of the data, a data packet is received from the terminal device, the data packet is capsulated to be a packet of the first wireless communication protocol, and the capsulated data packet is transmitted to the second network through the tunnel.

Further, in the exchanging of the data, the data packet capsulated to be the packet of the first wireless communication protocol is received through the tunnel, the capsulated data packet is converted into a packet of the second wireless communication protocol, and the converted data packet is transmitted to the terminal device through the second wireless data path.

In the establishing of the first wireless data path, a wireless link that follows the first wireless communication protocol is established with a base station of the first network, an authentication message is transmitted to an authentication server of the first network through the wireless link to perform an authentication process according to the authentication message by the authentication server of the first network, and the first wireless data path following the first wireless communication process is established with the first network when the authentication process is finished.

In the establishing of the second wireless data path, a wireless link that follows the second wireless communication protocol is established with the terminal device, an authentication message is received through the wireless link, the authentication message is transmitted to an authentication server of the second network through the first wireless data path to perform an authentication process according to the authentication message by the authentication server of the second network, and the second wireless data path that follows the second wireless communication protocol is established with the terminal device when the authentication process is finished.

In the receiving of the second network address, an address allocation message is received from the terminal device, the address allocation message is transmitted to an address allocation server of the second network through the first network and the first wireless data path to control the address allocation server of the second network to allocate a second network address, and the second network address is received through the first wireless data path.

According to another exemplary embodiment of the present invention, in a method for interworking with a first network to exchange data between a second network and a terminal device, a first wireless data path that follows a first wireless communication protocol is established with the first network, a first network address is received from an address allocation server of the first network through the first wireless data path, a second wireless data path that follows a second wireless communication protocol is established with the terminal device, a second network address is received from an address allocation server of the second network through the first wireless data path, the second network address is transmitted to the terminal device through the second wireless data path, a third network address is received from the address allocation server of the second network through the first wireless data path, and the data are exchanged with the second network.

Here the first wireless communication protocol supports a handover operation, and the second wireless communication protocol does not support a handover operation.

In the exchanging of the data, a first data packet that follows the second wireless communication protocol is received from the terminal device through the second wireless data path, the first data packet is converted into a second data packet that follows the first wireless communication protocol, and the second data packet is transmitted to the first network through the first wireless data path so that the first network transmits the second data packet to the second network.

The first data packet includes network address information of the second network that corresponds to a destination address of the first data packet, and the second data packet is transmitted to the first network through the first wireless data path according to a network address of the first network.

In the exchanging of the data, the first data packet that follows the first wireless communication protocol is received from the first network through the first wireless data path, the first data packet is converted into the second data packet that follows the first wireless communication protocol, the second data packet is transmitted to the terminal device through the second wireless data path.

The first data packet includes the second network address corresponding to a destination address of the first data packet, and the second data packet is transmitted to the terminal device through the second wireless data path according to the second network address.

DETAILED DESCRIPTION OF THE EMBODIMENTS

Figure 1:
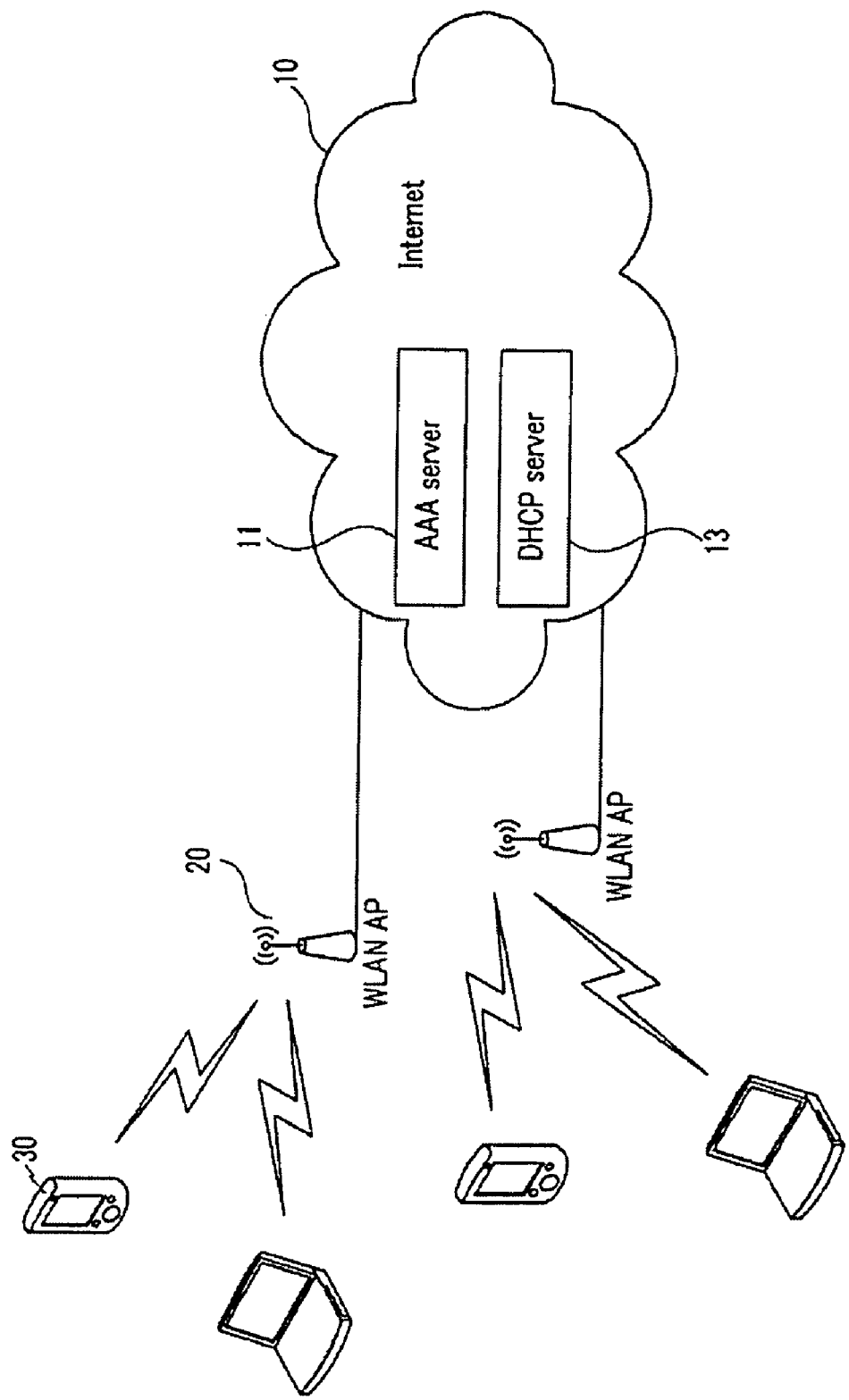
FIG. 1 shows a schematic diagram of a configuration of a wireless Internet.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements. The terms "module", "unit", and "block" used herein mean one unit that processes a specific function or operation, and may be implemented by hardware or software or a combination thereof.

A system for performing an interworking operation for a wireless local area network (WLAN) and a portable Internet according to an exemplary embodiment of the present invention and a method thereof will be described with reference to the figures.

Firstly, a configuration of a wireless Internet will be described with reference to FIG. 1.

FIG. 1 shows a schematic diagram of the configuration of the wireless Internet.

As shown in FIG. 1, the wireless Internet includes the Internet 10 and a WLAN AP 20, and it communicates with a terminal 30 through a radio channel.

The Internet 10 manages the WLAN AP 20 through a wired channel, and provides an Internet service to the terminal 30. The Internet 10 includes an authentication, authorization, and accounting (AAA) server 11 for authenticating the terminal that requests the Internet service, and a dynamic host configuration protocol (DHCP) server 13 for allocating an Internet protocol (IP) address to the authenticated terminal 30.

The WLAN AP 20 has a wireless communication area, and allows the terminal 30 to receive the Internet service of the Internet 10 when the terminal 30 accesses the WLAN AP 20. In this case, the WLAN AP 20 may also be referred to by various terms including a base station and a repeater.

The terminal 30 is a communication apparatus for accessing the wireless Internet through the radio channel to receive the Internet service from the Internet 10.

A system including an interworking device according to the exemplary embodiment of the present invention will be described with reference to FIG. 2.

Figure 2:
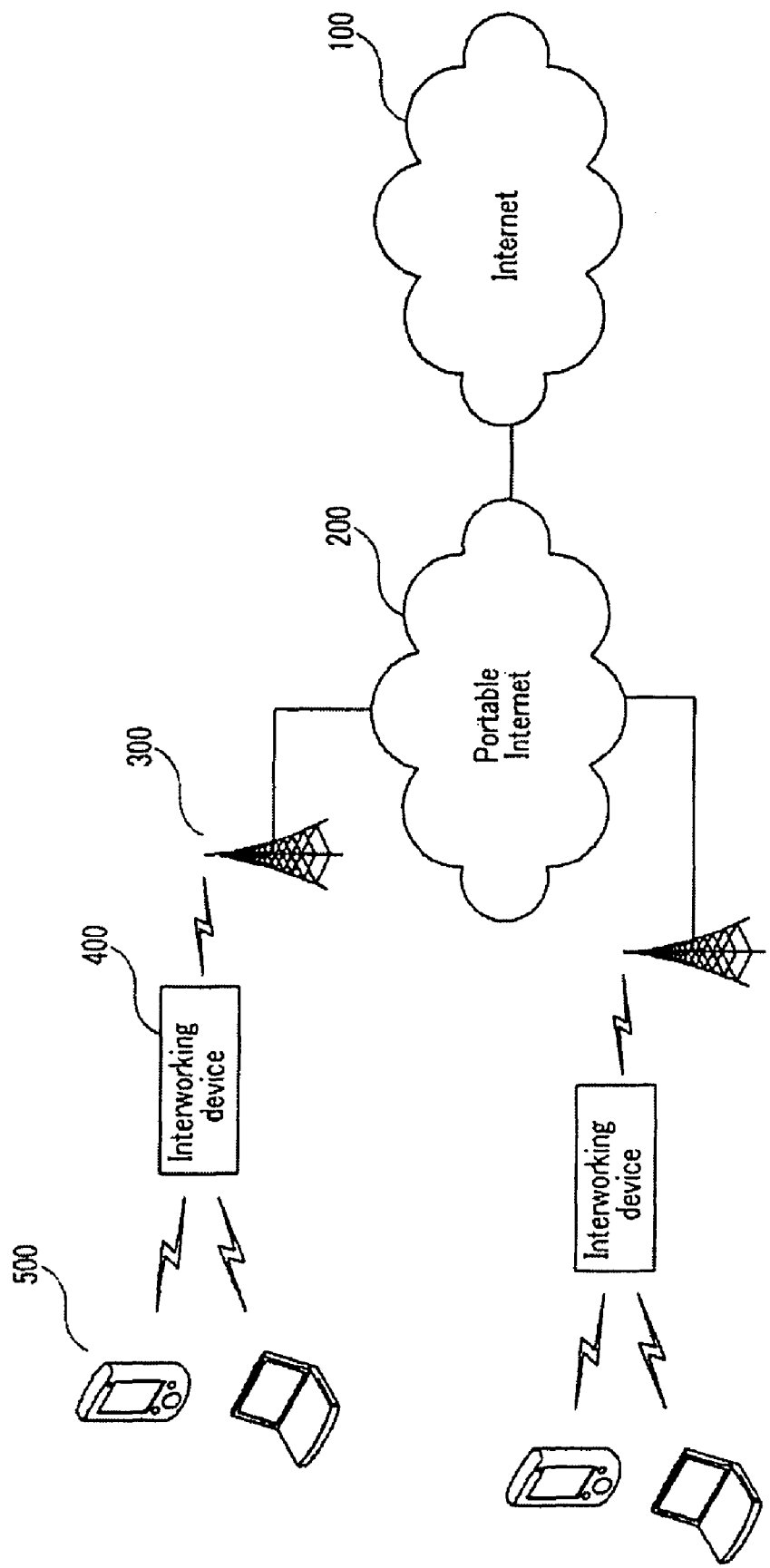
FIG. 2 is a diagram representing a system for performing an interworking operation for a wireless local area network (WLAN) and a portable Internet according to an exemplary embodiment of the present invention.

FIG. 2 is a diagram of the system for performing the interworking operation for the WLAN and the portable Internet according to the exemplary embodiment of the present invention.

As shown in FIG. 2, the system including the interworking device includes an Internet 100, a portable Internet 200, a base station 300, and an interworking device 400, and the system communicates with a terminal 500 through a radio channel.

The Internet 100 communicates with the portable Internet 200 through the wired channel, and transmits/receives data to/from the terminal 500 through the portable Internet 200 and the interworking device 400. The Internet 100 provides an e-mail service, a telnet service, a file transfer protocol (FTP) service, a Gopher service, and a World Wide Web (WWW) service.

The portable Internet 200 controls the base station 300, and communicates with the interworking device 400 through the base station 300 to connect the Internet 100 and the interworking device 400. The portable Internet 200 provides a service using a high speed Internet service in a moving state, which may be referred to as "wireless portable Internet", "wireless wideband Internet", "wireless high speed Internet", and wireless broadband Internet (WiBro)".

The base station 300 communicates with the interworking device 400 through the radio channel according to a control operation of the portable Internet 200.

The interworking device 400 communicates with the portable Internet 200 through the base station 300, and communicates with the Internet 100 through the portable Internet 200. In this case, the portable Internet 200 may acknowledge the interworking device 400 as a portable Internet terminal.

The terminal 500 communicates with the interworking device 400 through the radio channel, and transmits/receives data to/from the Internet 100 through the portable Internet 200 and the interworking device 400. Here, the terminal 500 may access the wireless Internet through the interworking device 400, and in this case, the terminal 500 may acknowledge the interworking device 400 as the WLAN AP.

The system including the interworking device according to the exemplary embodiment of the present invention will be described in further detail with reference to FIG. 3.

Figure 3:
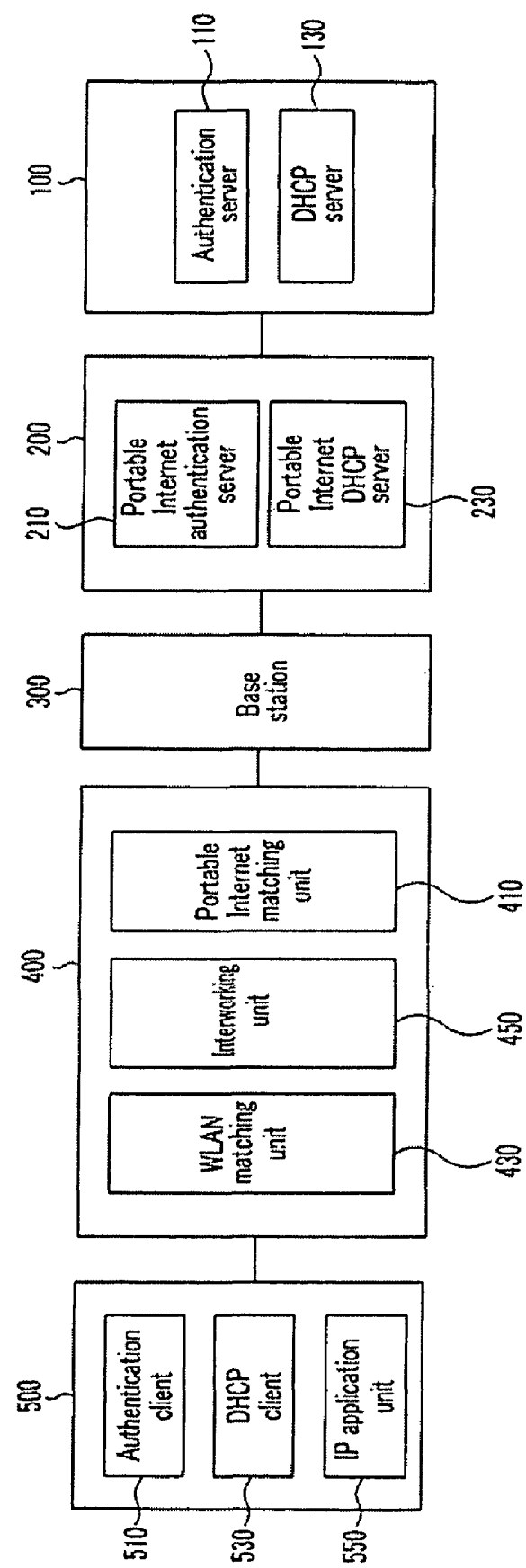
FIG. 3 is a diagram of a configuration of the system for performing the interworking operation for the WLAN and the portable Internet according to the exemplary embodiment of the present invention.

FIG. 3 is a diagram of the system for performing the interworking operation for the WLAN and the portable Internet according to the exemplary embodiment of the present invention.

As shown in FIG. 3, the system including the interworking device includes the Internet 100, the portable Internet 200, the base station 300, and the interworking device 400, and the system communicates with the terminal 500 through the radio channel.

The Internet 100 includes an authentication server 110 for authenticating a terminal accessed to the Internet 100, and a dynamic host configuration protocol (DHCP) server 130 for allocating a network address to the terminal authenticated by the authentication server 110.

The portable Internet 200 includes a portable Internet authentication server 210 for authenticating a portable Internet terminal accessed to the portable Internet and a portable Internet DHCP server 230 for allocating a network address to the portable Internet terminal authenticated by the portable Internet authentication server 210.

The base station 300 communicates with the interworking device 400 through the radio channel according to a control operation of the portable Internet 200.

The interworking device 400 includes a portable Internet matching unit 410 for accessing the portable Internet 200 as a portable Internet terminal to communicate with the portable Internet 200, a WLAN matching unit 430 operating as the WLAN AP for the terminal accessed to the interworking device 400, and an interworking unit 450 for performing an interworking operation for the portable Internet matching unit 410 and the WLAN matching unit 430 to provide an authentication function and an address allocation function.

The terminal 500 includes an authentication client 510 for requesting an authentication operation for the terminal 500, a DHCP client 530 for requesting a network address for the terminal 500, and an IP application unit 550 for communicating with the interworking device 400 according to the network address allocated to the terminal 500. In this case, the authentication client 510 may request the authentication operation for the terminal through an authentication message, and the DHCP client 530 may request the IP address for the terminal 500 through a DHCP message.

The portable Internet matching unit of the interworking device according to the exemplary embodiment of the present invention will be described with reference to FIG. 4.

Figure 4:
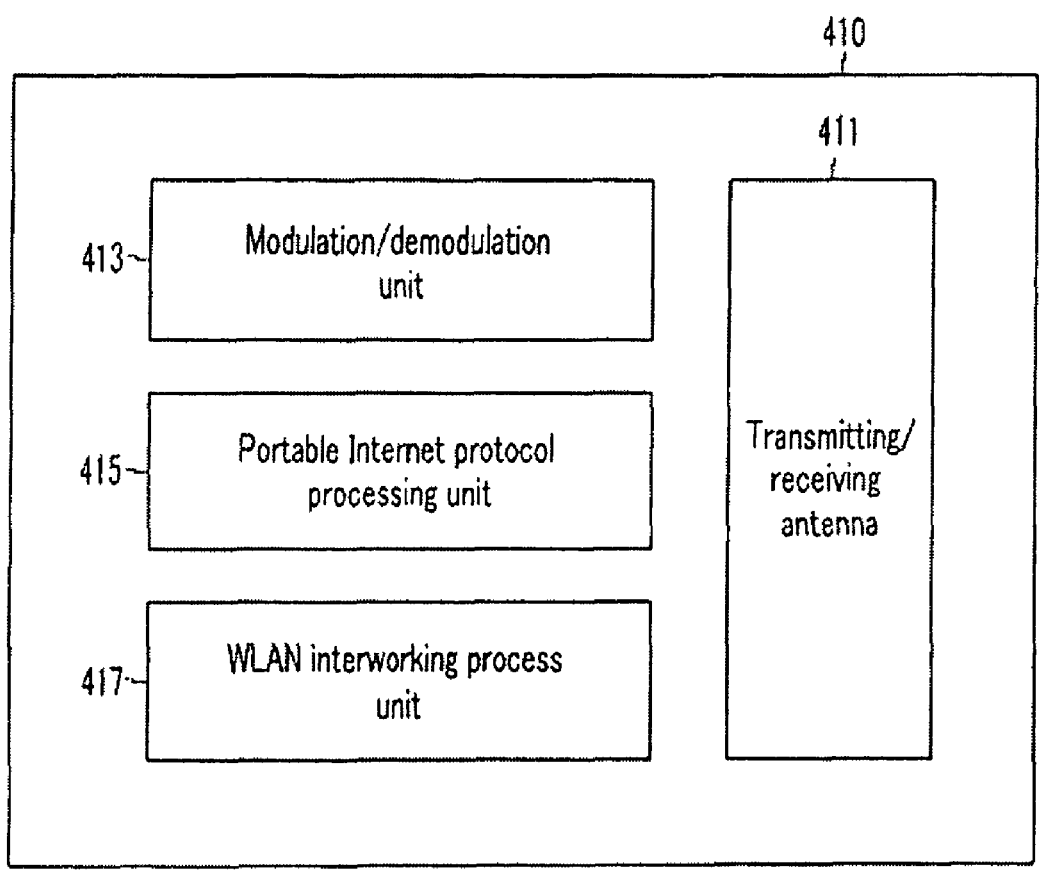
FIG. 4 is a schematic diagram of a portable Internet matching unit according to the exemplary embodiment of the present invention.

FIG. 4 is a schematic diagram of the portable Internet matching unit according to the exemplary embodiment of the present invention.

As shown in FIG. 4, the portable Internet matching unit 410 includes a transmitting/receiving antenna 411, a modulation/demodulation unit 413, a portable Internet protocol processing unit 415, and a WLAN interworking process unit 417.

The transmitting/receiving antenna 411 transmits a signal through the ratio channel, and receives the signal transmitted through the radio channel.

The modulation/demodulation unit 413 modulates a digital signal to an analog signal, and demodulates an analog signal to a digital signal. The modulation/demodulation unit 413 may be referred to as a "modem".

The portable Internet protocol processing unit 415 processes a portable Internet protocol.

The WLAN interworking process unit 417 processes the interworking operation with the WLAN matching unit 430.

The WLAN matching unit of the interworking device according to the exemplary embodiment of the present invention will be described with reference to FIG. 5.

Figure 5:
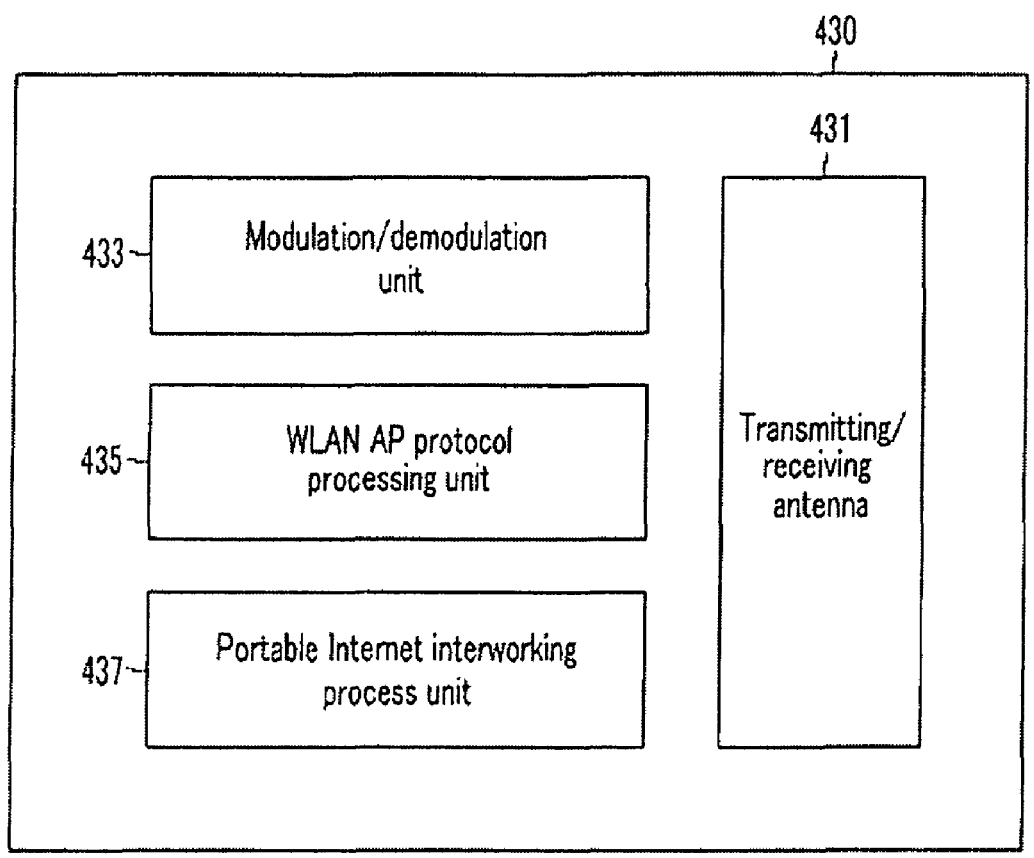
FIG. 5 is a schematic diagram of a WLAN matching unit according to the exemplary embodiment of the present invention.

FIG. 5 is a schematic diagram of the WLAN matching unit according to the exemplary embodiment of the present invention.

As shown in FIG. 5, the WLAN matching unit 430 includes a transmitting/receiving antenna 431, a modulation/demodulation unit 433, a WLAN AP protocol processing unit 435, and a portable Internet interworking process unit 437.

The transmitting/receiving antenna 431 transmits a signal through the radio channel, and receives the signal transmitted through the radio channel.

The modulation/demodulation unit 433 modulates a digital signal to an analog signal, and demodulates the analog signal to a digital signal. The modulation/demodulation unit 433 may be referred to as a "modem".

The WLAN AP protocol processing unit 435 processes a WLAN AP protocol.

The portable Internet interworking process unit 437 processes the interworking operation with the portable Internet matching unit 410.

The Interworking unit of the interworking device according to the exemplary embodiment of the present invention will be described with reference to FIG. 6.

Figure 6:
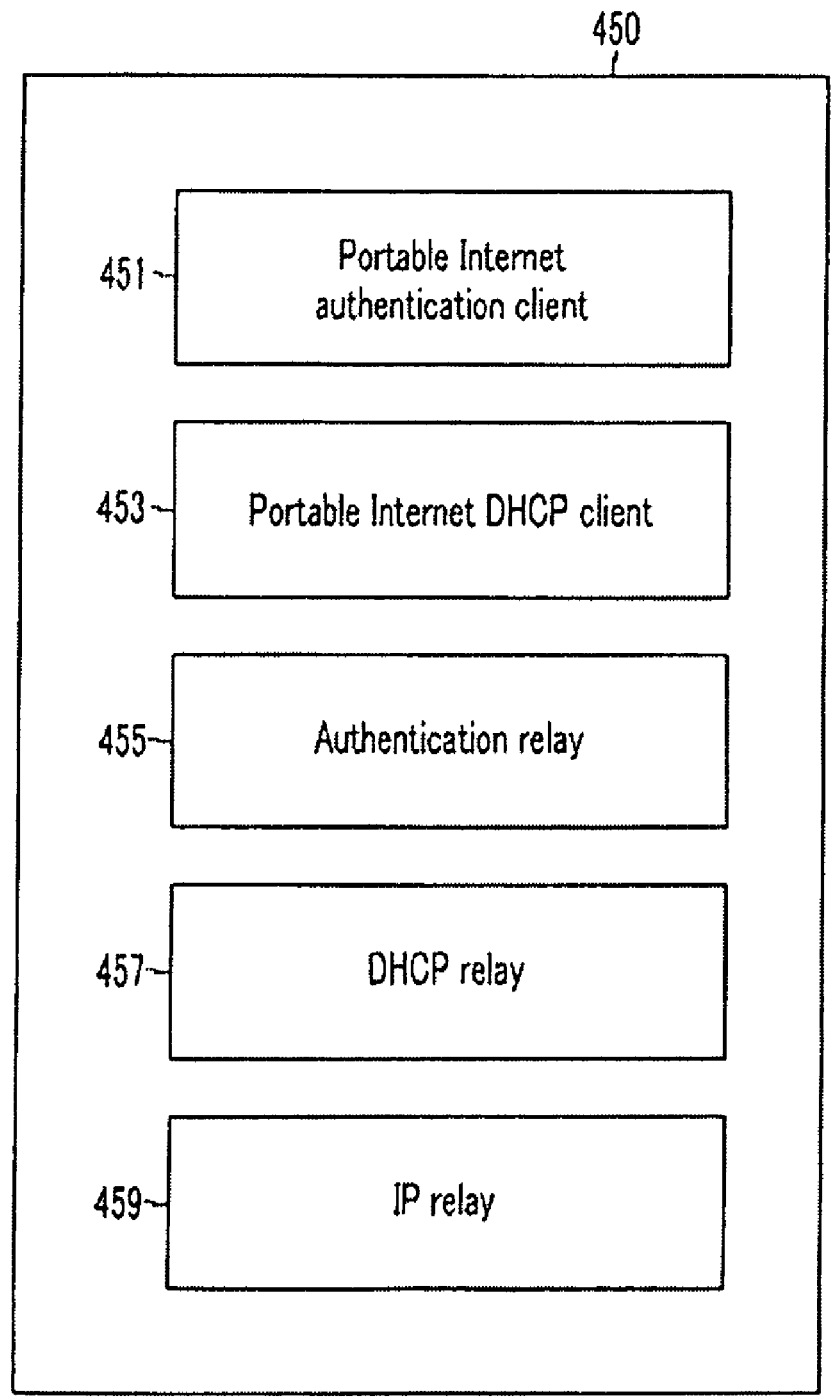
FIG. 6 is a schematic diagram of an interworking unit according to the exemplary embodiment of the present invention.

FIG. 6 is a schematic diagram of the interworking unit according to the exemplary embodiment of the present invention.

As shown in FIG. 6, the interworking unit 450 includes a portable Internet authentication client 451, a portable Internet DHCP client 453, an authentication relay 455, a DHCP relay 457, and an IP relay 459.

The portable Internet authentication client 451 requests an authentication operation for the portable Internet matching unit 410 of the interworking device 400 from the portable Internet 200. In this case, the portable Internet authentication client 451 may request the authentication operation from the portable Internet 200 through a portable Internet authentication message.

The portable Internet DHCP client 453 requests the portable Internet 200 to allocate a network address for the portable Internet matching unit 410 of the interworking device 400. In this case, the portable Internet DHCP client 453 may request the portable Internet 200 to allocate the network address through the DHCP message.

The authentication relay 455 transmits an authentication message when the WLAN matching unit 430 receives the authentication message corresponding to an authentication request from the terminal 500, and it transmits an authentication response message to the WLAN matching unit 430 when the portable Internet matching unit 410 receives the authentication response message corresponding to the authentication message.

The DHCP relay 457 transmits the DHCP message to the portable Internet matching unit 410 when the WLAN matching unit 430 receives the DHCP message corresponding to an address allocation request from the terminal 500, and transmits a DHCP response message to the WLAN matching unit 430 when the portable Internet matching unit 410 receives the DHCP response message corresponding to the DHCP message.

The IP relay 459 transmits data received by the portable Internet matching unit 410 to the WLAN matching unit 430, and transmits data received by the WLAN matching unit 430 to the portable Internet matching unit 410. In this case, the IP relay 459 may convert the data according to a standard of the portable Internet 200 when transmitting the data to the portable Internet matching unit 410, and it may convert the data according to a standard of the terminal 500 when transmitting the data to the WLAN matching unit 430.

A signaling method in a tunneling mode by the system including the interworking device according to the exemplary embodiment of the present invention will be described with reference to FIG. 7.

Figure 7:
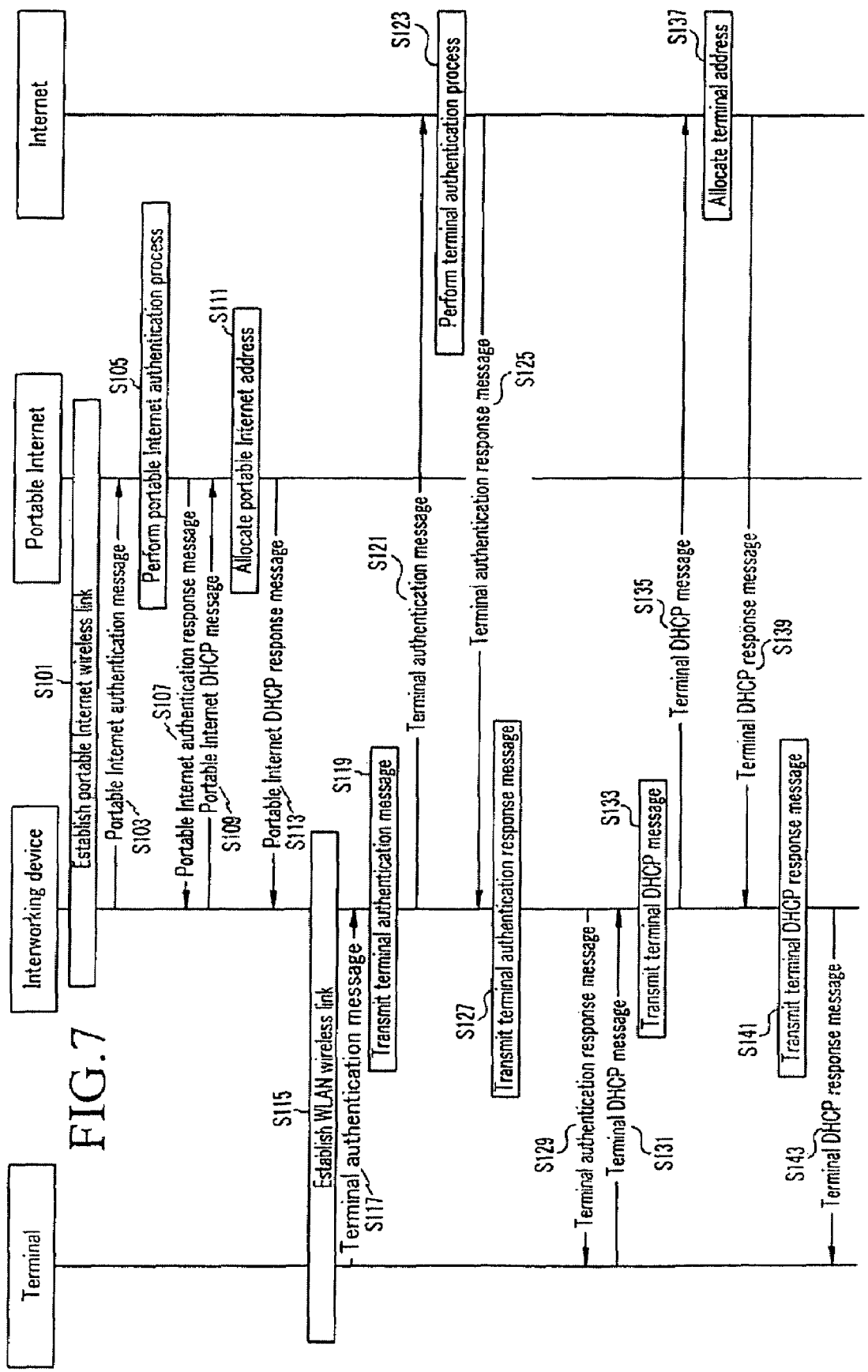
FIG. 7 is a flowchart representing a signaling method in a tunneling mode by a system including an interworking device according to the exemplary embodiment of the present invention.

FIG. 7 is a flowchart representing the signaling method in the tunneling mode by the system including the interworking device according to the exemplary embodiment of the present invention.

As shown in FIG. 7, the interworking device 400 establishes a portable Internet wireless link with the portable Internet 200 in step S101. In this case, since the portable Internet 200 accesses the base station 300 through a wired link and the portable Internet matching unit 410 of the interworking device 400 establishes a wireless link with the base station 300, the interworking device 400 may establish a portable Internet wireless link. In addition, the portable Internet wireless link may follow a portable Internet communication protocol defined by IEEE 802.16, and the portable Internet communication protocol supports a terminal handover operation.

The interworking device 400 transmits the portable Internet authentication message to the portable Internet 200 in step S103. The portable Internet authentication client 451 of the interworking device 400 uses the portable Internet authentication message to control the portable Internet 200 to authenticate the portable Internet matching unit 410 of the interworking device 400. In this case, the portable Internet matching unit 410 may transmit the portable Internet authentication message to the portable Internet 200 and the portable Internet authentication server 210 through the portable Internet wireless link.

Subsequently, the portable Internet authentication server 210 of the portable Internet 200 performs a portable Internet authentication process according to the portable Internet authentication message in step S105. The portable Internet authentication process may vary according to characteristics of the portable Internet 200. In this case, the portable Internet 200 acknowledges the portable Internet matching unit 410 of the interworking device 400 as a portable Internet terminal and performs the authentication process.

The portable Internet 200 transmits the portable Internet authentication response message to the interworking device 400 in response to the portable Internet authentication message in step S107. In this case, the interworking unit 450 of the interworking device 400 establishes a portable Internet data path between the portable Internet matching unit 410 and the portable Internet 200 according to the portable Internet authentication response message. In addition, the interworking device 400 may establish the portable Internet data path according to a portable Internet communication protocol defined by IEEE 802.16.

The interworking device 400 transmits a portable Internet DHCP message to the portable Internet 200 in step S109. The portable Internet DHCP client 453 of the interworking device 400 uses the portable Internet DHCP message to request the portable Internet 200 to allocate the network address for the portable Internet matching unit 410. In this case, the portable Internet matching unit 410 may transmit the portable Internet DHCP message to the portable Internet DHCP server 230 of the portable Internet 200 through the portable Internet data path.

The portable Internet 200 allocates the network address of the interworking device 400 according to the portable Internet DHCP message in step S111. The portable Internet DHCP server 230 of the portable Internet 200 allocates the network address for the portable Internet matching unit 410. In this case, the portable Internet DHCP server 230 may allocate the IP address corresponding to the network address.

The portable Internet 200 transmits a portable Internet DHCP response message to the interworking device 400 in response to the portable Internet DHCP message in step S113. The portable Internet DHCP response message includes the IP address allocated for the portable Internet matching unit 410 by the portable Internet DHCP server 230.

The terminal 500 establishes a WLAN wireless link with the interworking device 400 in step S115. The terminal 500 establishes the WLAN wireless link with the WLAN matching unit 430 of the interworking device 400. In this case, the WLAN wireless link may follow a WLAN communication protocol defined by IEEE 802.11, and the WLAN communication protocol does not support the terminal handover operation.

Subsequently, the terminal 500 transmits a terminal authentication message to the interworking device 400 in step S117. The authentication client 510 of the terminal 500 transmits the terminal authentication message to the WLAN matching unit 430 of the interworking device 400 through the WLAN wireless link.

The WLAN matching unit 430 of the interworking device 400 receives the terminal authentication message, and transmits the terminal authentication message to the interworking unit 450 in step S119.

The interworking unit 450 of the interworking device 400 transmits the terminal authentication message to the Internet 100 in step S121. The authentication relay 455 of the interworking unit 450 transmits the terminal authentication message to the authentication server 110 of the Internet 100. The authentication relay 455 transmits the terminal authentication message to the Internet 100 accessed to the portable Internet 200 through the portable Internet 200 in the portable Internet data path. In this case, when the portable Internet matching unit 410 has exclusive access to the portable Internet 200, the authentication relay 455 detects a media access control (MAC) address of the authentication server 110 to re-write the terminal authentication message in a MAC packet type, and transmits it to the authentication server 110.

The Internet 100 performs an authentication process according to the terminal authentication message in step S123. In this case, the authentication process may vary according to characteristics of the Internet 100.

The Internet 100 transmits a terminal authentication response message to the interworking device 400 in response to the terminal authentication message in step S125. The Internet 100 transmits the terminal authentication response message to the interworking device 400 through the portable Internet 200 in the portable Internet data path.

The portable Internet matching unit 410 of the interworking device 400 receives the terminal authentication response message, and transmits the terminal authentication response message to the interworking unit 450 in step S127.

The interworking unit 450 of the interworking device 400 transmits the terminal authentication response message to the terminal 500 in step S129. The authentication relay 455 of the interworking unit 450 transmits the terminal authentication response message to the terminal 500 through the WLAN wireless link. In this case, the interworking unit 450 of the interworking device 400 establishes a WLAN data path between the WLAN matching unit 430 and the terminal 500 according to the terminal authentication response message. In addition, the interworking device 400 may establish the WLAN data path according to the WLAN communication protocol defined by IEEE 802.11. Accordingly, the authentication process for the terminal 500 is finished.

Subsequently, the terminal 500 transmits a terminal DHCP message to the interworking device 400 in step S131. The DHCP client 530 of the terminal 500 transmits the terminal DHCP message to the WLAN matching unit 430 of the interworking device 400 through the WLAN data path.

Subsequently, the WLAN matching unit 430 of the interworking device 400 receives the terminal DHCP message, and transmits the terminal DHCP message to the interworking unit 450 in step S133.

The interworking unit 450 of the interworking device 400 transmits the terminal DHCP message to the Internet 100 in step S135. The DHCP relay 457 of the interworking unit 450 transmits the terminal DHCP message to the DHCP server 130 of the Internet 100. The DHCP relay 457 transmits the terminal DHCP message to the Internet 100 accessed to the portable Internet 200 through the portable Internet data path. In this case, the DHCP relay 457 may transmit the terminal DHCP message to the Internet 100 by using the exclusive access established to transmit the terminal authentication message. In addition, the DHCP relay 457 may establish a destination address of the terminal DHCP message as an address of the DHCP server 130 to directly transmit the terminal DHCP message to the DHCP server 130 of the Internet 100.

The Internet 100 allocates the network address of the terminal 500 according to the terminal DHCP message in step S137. The DHCP sever 130 of the Internet 100 allocates the network address of the terminal 500 according to the terminal DHCP message. In this case, the DHCP server 130 may allocate the IP address corresponding to the network address.

The Internet 100 transmits a terminal DHCP response message to the interworking device 400 in response to the terminal DHCP message in step S139. The Internet 100 transmits the terminal DHCP response message to the interworking device 400 through the portable Internet 200 and the portable Internet data path.

The portable Internet matching unit 410 of the interworking device 400 receives the terminal DHCP response message, and transmits the terminal DHCP response message to the interworking unit 450 in step S141.

The interworking unit 450 of the interworking device 400 transmits the terminal DHCP response message to the terminal 500 in step S143. The DHCP relay 457 of the interworking unit 450 transmits the terminal DHCP response message through the terminal 500 through the WLAN data path. Accordingly, the signaling process for the terminal 500 is finished.

A method for exchanging data in the tunneling mode by the system including the interworking device according to the exemplary embodiment of the present invention will be described with reference to FIG. 8.

Figure 8:
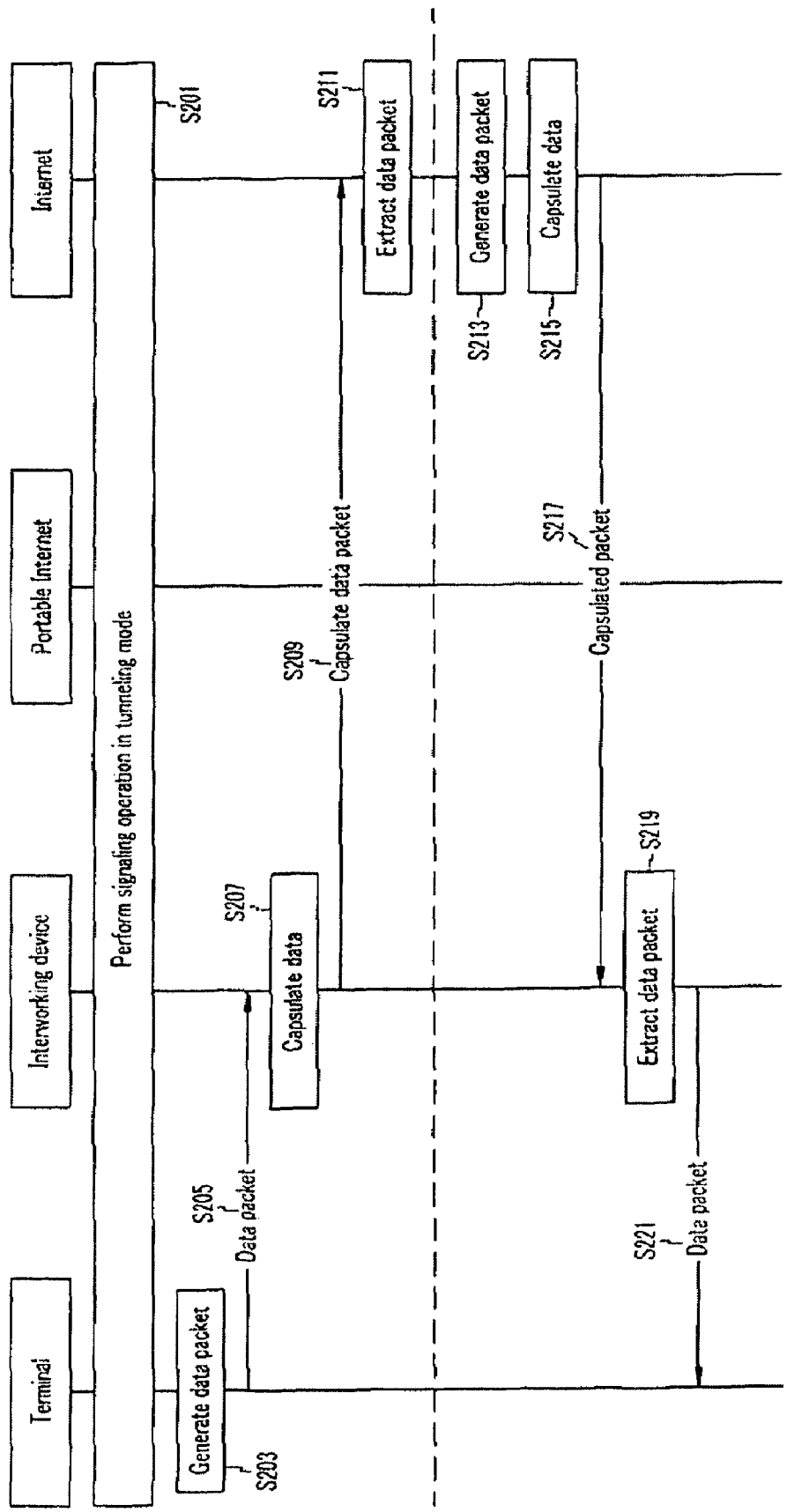
FIG. 8 is a flowchart representing a method for exchanging data in the tunneling mode by the system including the interworking device according to the exemplary embodiment of the present invention.

FIG. 8 is a flowchart representing the method for exchanging the data in the tunneling mode by the system including the interworking device according to the exemplary embodiment of the present invention.

As shown in FIG. 8, the terminal 500 performs a signaling operation in the tunneling mode through the system including the interworking device 400 in step S201.

The terminal 500 generates a data packet to be transmitted to the Internet 100 in step S203. The data packet includes the IP address of the Internet 100 and the IP address of the terminal 500. The terminal 500 may determine a destination address of the data packet as the IP address of the Internet 100, and may determine a source address as the IP address of the terminal 500. In this case, the terminal 500 may generate the data packet in a WLAN IP packet type. In addition, the terminal 500 may generate the data packet as a double layer packet type.

The terminal 500 transmits the data packet to the interworking device 400 in step S205. The terminal 500 transmits the data packet to the interworking device 400 through the WLAN data path.

The interworking device 400 capsulates the data packet in step S207. The interworking unit 450 of the interworking device 400 capsulates the data packet received through the WLAN matching unit 430. In this case, the IP relay 459 of the interworking unit 450 capsulates the data packet in the WLAN IP packet type to be the data packet in the portable Internet IP packet type. In addition, the IP relay 459 capsulates the data packet in the portable Internet IP packet type so as to be transmitted to the Internet 100 through the portable Internet 200.

Subsequently, the interworking device 400 transmits the capsulated data packet to the Internet 100 in step S209. The interworking unit 450 of the interworking device 400 uses the portable Internet matching unit 410 to transmit the data packet capsulated in the portable Internet IP packet type to the Internet 100. In this case, the IP relay 459 of the interworking unit 450 forms an IP tunnel that passes through the portable Internet between the portable Internet matching unit 410 and Internet 100, and transmits the capsulated data packet through the IP tunnel. In addition, the IP relay 459 provides an IP tunnel of IPv6 for transmitting an IP packet of IPv6 when the Internet 100 uses IPv4 and the portable Internet 200 uses IPv6, and the IP relay 459 provides an IP tunnel of IPv4 for transmitting an IP packet of IPv6 when the Internet 100 uses IPv6 and the portable Internet 200 uses IPv4.

The Internet 100 receives the capsulated data packet, and extracts the data packet from the capsulated data packet in step S211. The Internet 100 cancels the capsulation so that the data packet in the WLAN IP packet type may be extracted from the data packet in the portable Internet IP packet type.

The Internet 100 generates the data packet to be transmitted to the terminal 500 in step S213. The data packet includes the IP address of the Internet 100 and the IP address of the terminal 500. The Internet 100 determines the destination address of the data packet as the IP address of the terminal 500 and determines the source address as the IP address of the Internet 100. In this case, the Internet 100 may generate the data packet in the IP packet type. In addition, the Internet 100 may generate the data packet in the double layer packet type.

The Internet 100 capsulates the data packet in step S215. In this case, the Internet 100 capsulates the data packet in the WLAN IP packet type to be the data packet in the portable Internet IP packet type. In addition, the Internet 100 capsulates the data packet in the portable Internet IP packet type so that the data packet is transmitted to the Internet 100 through the portable Internet 200.

The Internet 100 transmits the capsulated data packet to the interworking device 400 in step S217. The Internet 100 transmits the data packet capsulated in the portable Internet IP packet to the portable Internet matching unit 410 of the interworking device 400. In this case, the Internet 100 may transmit the capsulated data packet to the portable Internet matching unit 410 through the IP tunnel.

The interworking device 400 receives the capsulated data packet, and extracts the data packet from the capsulated data packet in step S219. The portable Internet matching unit 410 of the interworking device 400 receives the capsulated data packet, the IP relay 459 of the interworking unit 450 cancels the capsulation, and therefore the data packet in the WLAN IP packet type is extracted from the capsulated data packet.

The interworking device 400 transmits the data packet to the terminal 500 in step S221. The interworking unit 450 of the interworking device 400 transmits the data packet to the terminal 500 through the WLAN matching unit 430. In this case, the IP relay 459 of the interworking unit 450 may transmit the data packet to the corresponding terminal 500 through the WLAN data path according to the IP address of the terminal 500 included in the data packet.

A method for signaling in a routing mode by the system including the interworking device according to the exemplary embodiment of the present invention will be described with reference to FIG. 9.

Figure 9:
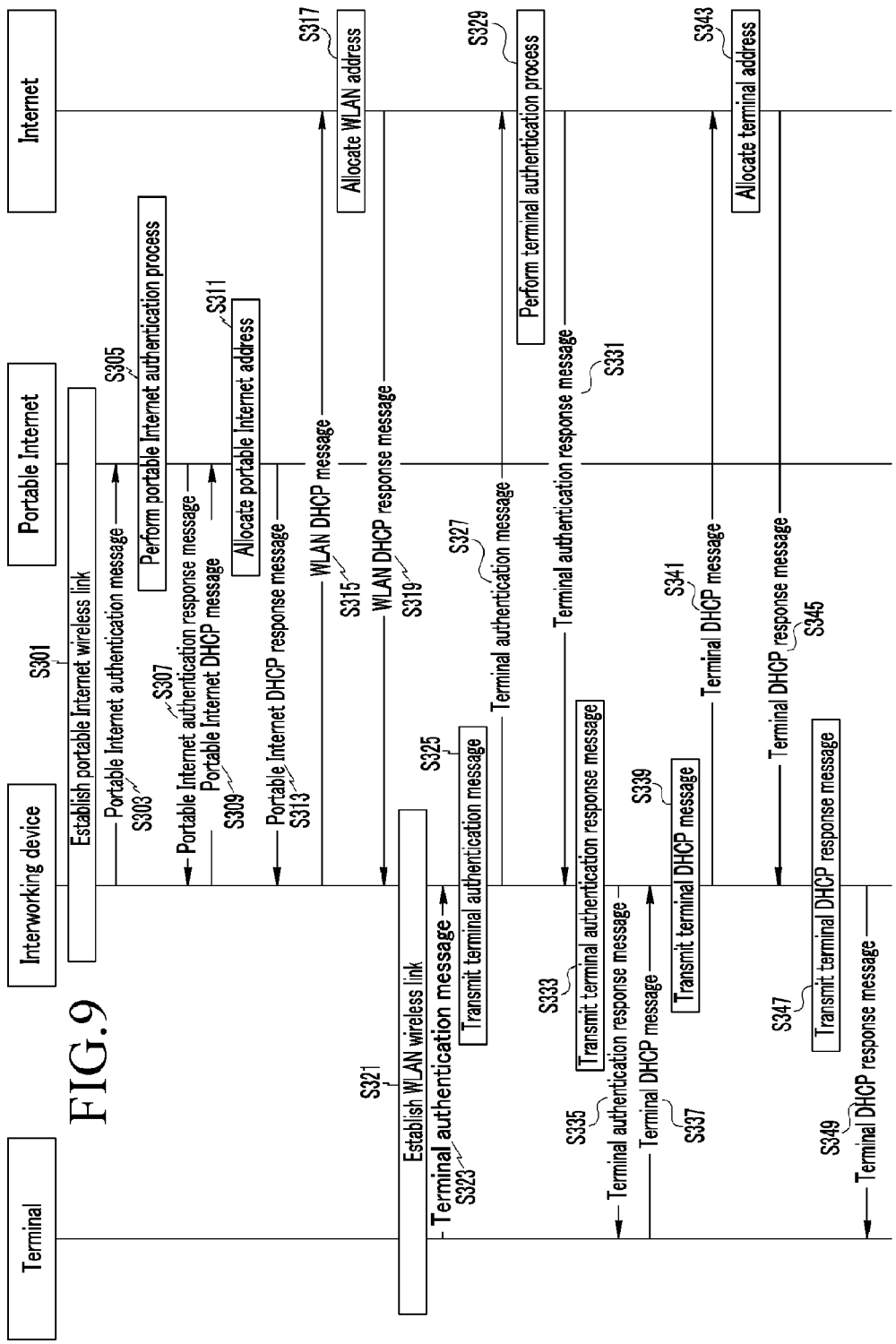
FIG. 9 is a flowchart representing a method for signaling in a routing mode by the system including the interworking device according to the exemplary embodiment of the present invention.

FIG. 9 is a flowchart representing the method for signaling in the routing mode by the system including the interworking device according to the exemplary embodiment of the present invention.

As shown in FIG. 9, the interworking device 400 establishes a portable Internet wireless link with the portable Internet 200 in step S301. In this case, the portable Internet 200 is accessed to the base station 300 through the wired link, the portable Internet matching unit 410 of the interworking device 400 establishes the wireless link with the base station 300, and therefore the interworking device 400 may establish the portable Internet wireless link. In addition, the portable Internet wireless link may follow the portable Internet communication protocol defined by IEEE 802.16, and the portable Internet communication protocol supports the terminal handover operation.

The interworking device 400 transmits the portable Internet authentication message to the portable Internet 200 in step S303. The portable Internet authentication client 451 of the interworking device 400 uses the portable Internet authentication message to control the portable Internet 200 to authenticate the portable Internet matching unit 410 of the interworking device 400. The portable Internet matching unit 410 may transmit the portable Internet authentication message to the portable Internet authentication server 210 of the portable Internet 200 through the portable Internet wireless link.

The portable Internet authentication server 210 of the portable Internet 200 performs the portable Internet authentication process according to the portable Internet authentication message in step S305. The portable Internet authentication process may vary according to the characteristics of the portable Internet 200. In this case, the portable Internet 200 acknowledges the portable Internet matching unit 410 of the interworking device 400 as the portable Internet terminal and performs the authentication process.

The portable Internet 200 transmits the portable Internet authentication response message to the interworking device 400 in response to the portable Internet authentication message in step S307. In this case, the interworking unit 450 of the interworking device 400 establishes the portable Internet data path between the portable Internet matching unit 410 and the portable Internet 200 according to the portable Internet authentication response message. In addition, the interworking device 400 may establish the portable Internet data path according to the portable Internet communication protocol defined by IEEE 802.16.

The interworking device 400 transmits the portable Internet DHCP message to the portable Internet 200 in step S309. The portable Internet DHCP client 453 of the interworking device 400 uses the portable Internet DHCP message to request the portable Internet 200 to allocate the network address for the portable Internet matching unit 400. In this case, the portable Internet matching unit 410 may transmit the portable Internet DHCP message to the portable Internet DHCP server 230 of the portable Internet 200 through the portable Internet data path.

The portable Internet 200 allocates the network address of the interworking device 400 according to the portable Internet DHCP message in step S311. The portable Internet DHCP server 230 of the portable Internet 200 allocates the network address for the portable Internet matching unit 410. In this case, the portable Internet DHCP server 230 may allocate the IP address corresponding to the network address.

The portable Internet 200 transmits the portable Internet DHCP response message to the interworking device 400 in response to the portable Internet DHCP message in step S313. The portable Internet DHCP response message includes the IP address allocated to the portable Internet matching unit 410 by the portable Internet DHCP server 230.

The interworking unit 450 of the interworking device 400 transmits a WLAN DHCP message to the Internet 100 in step S315. The IP relay 459 of the interworking unit 450 uses the WLAN DHCP message to request the Internet 100 to allocate the network address for WLAN matching unit 430 of the interworking device 400. The IP relay 459 transmits the WLAN DHCP message to the Internet 100 accessed to the portable Internet 200 through the portable Internet data path.

The Internet 100 allocates the network address for the interworking device 400 according to the WLAN DHCP message in step S317. The DHCP server 130 of the Internet 100 allocates the network address for the WLAN matching unit 430 of the interworking device 400 according to the WLAN DHCP message. In this case, the DHCP server 130 may allocate the IP address corresponding to the network address.

The Internet 100 transmits a WLAN DHCP response message to the interworking device 400 in response to the WLAN DHCP message in step S319. The Internet 100 transmits the WLAN DHCP response message to the portable Internet matching unit 410 of the interworking device 400 through the portable Internet 200 and the portable Internet data path. Subsequently, the portable Internet matching unit 410 transmits the WLAN DHCP response message to the IP relay 459 of the interworking unit 450, and the network address allocation for to the WLAN matching unit 430 of the interworking device 400 is finished.

The terminal 500 establishes the WLAN wireless link with the interworking device 400 in step S321. The terminal 500 establishes the WLAN wireless link with the WLAN matching unit 430 of the interworking device 400. In this case, the WLAN wireless link may follow the WLAN communication protocol defined by IEEE 802.11, and the WLAN communication protocol does not support the terminal handover operation.

The terminal 500 transmits the terminal authentication message to the interworking device 400 in step S323. The authentication client 510 of the terminal 500 transmits the terminal authentication message to the WLAN matching unit 430 of the interworking device 400 through the WLAN wireless link.

Subsequently, the WLAN matching unit 430 of the interworking device 400 receives the terminal authentication message, and transmits the terminal authentication message to the interworking unit 450 in step S325.

The interworking unit 450 of the interworking device 400 transmits the terminal authentication message to the Internet 100 in step S327. The authentication relay 455 of the interworking unit 450 transmits the terminal authentication message to the authentication server 110 of the Internet 100. The authentication relay 455 transmits the terminal authentication message to the Internet 100 accessed to the portable Internet 200 through the portable Internet data path. When the portable Internet matching unit 410 includes an exclusive access to the portable Internet 200, the authentication relay 455 re-writes the terminal authentication message as an IP packet in which the IP address of the authentication server 110 is determined as a destination address and the IP address of the WLAN matching unit 430 is determined as a source address, and the authentication relay 455 may transmit the terminal authentication message to the authentication server 110. In addition, the IP relay 459 operates as a router to establish a data path so that the authentication relay 455 transmits the terminal authentication message in the IP packet type to the Internet 100 through the portable Internet 200.

The Internet 100 performs the authentication process according to the terminal authentication message in step S329. In this case, the authentication process for the terminal 500 may vary according to the characteristics of the Internet 100.

The Internet 100 transmits the terminal authentication response message to the interworking device 400 in response to the terminal authentication message in step S331. The Internet 100 transmits the terminal authentication response message to the interworking device 400 through the portable Internet 200 and the wireless link between the portable Internet 200 and the portable Internet matching unit 410. In this case, the Internet 100 may determine the destination address of the terminal authentication response message to be the IP address of the WLAN matching unit 430. In addition, the portable Internet 200 may operate as a router.

Subsequently, the portable Internet matching unit 410 of the interworking device 400 receives the terminal authentication response message, and transmits it to the interworking unit 450 in step S333.

The interworking unit 450 of the interworking device 400 transmits the terminal authentication response message to the terminal 500 in step S335. The authentication relay 455 of the interworking unit 450 transmits the terminal authentication response message to the terminal 500 through the WLAN wireless link. In this case, the interworking unit 450 of the interworking device 400 establishes the WLAN data path between the WLAN matching unit 430 and the terminal 500 according to the terminal authentication response message. In addition, the interworking device 400 may establish the WLAN data path according to the WLAN communication protocol defined by IEEE 802.11. Accordingly, the authentication for the terminal 500 is finished.

The terminal 500 transmits the terminal DHCP message to the interworking device 400 in step S337. The DHCP client 530 of the terminal 500 transmits the terminal DHCP message to the WLAN matching unit 430 of the interworking device 400 through the WLAN data path.

The WLAN matching unit 430 of the interworking device 400 receives the terminal DHCP message, and transmits it to the interworking unit 450 in step S339.

The interworking unit 450 of the interworking device 400 transmits the terminal DHCP message to the Internet 100 in step S341. The DHCP relay 457 of the interworking unit 450 transmits the terminal DHCP message to the DHCP server 130 of the Internet 100. The DHCP relay 457 transmits the terminal DHCP message to the Internet 100 accessed to the portable Internet 200 through the portable Internet 200 and the portable Internet data path. In this case, the DHCP relay 457 may transmit the terminal DHCP message to the Internet 100 by using the exclusive access established to transmit the terminal authentication message. In addition, the DHCP relay 457 may establish the destination address of the terminal DHCP message as an address of the DHCP server 130 to directly transmit the terminal DHCP message to the DHCP server 130 of the Internet 100. Further, the IP relay 459 operates as a router to establish the data path so that the DHCP relay 457 may transmit the terminal DHCP message in the IP packet type to the Internet 100 through the portable Internet 200.

The Internet 100 allocates the network address of the terminal 500 according to the terminal DHCP message in step S343. The DHCP server 130 of the Internet 100 allocates the network address of the terminal 500 according to the terminal DHCP message. In this case, the DHCP server 130 may allocate the IP address corresponding to the network address.

The Internet 100 transmits the terminal DHCP response message to the interworking device 400 in response to the terminal DHCP message in step S345. The Internet 100 transmits the terminal DHCP response message to the interworking device 400 through the portable Internet 200 and the portable Internet data path. In this case, the Internet 100 may determine the destination address of the terminal authentication response message as the IP address of the WLAN matching unit 430. In addition, the portable Internet 200 may operate as a router.

The portable Internet matching unit 410 of the interworking device 400 receives the terminal DHCP response message, and transmits it to the interworking unit 450 in step S347.

The interworking unit 450 of the interworking device 400 transmits the terminal DHCP response message to the terminal 500 in step S349. The DHCP relay 457 of the interworking unit 450 transmits the terminal DHCP response message to the terminal 500 through the WLAN data path. Accordingly, the signaling operation for the terminal 500 is finished.

A method for exchanging data in the routing mode by the system including the interworking device according to the exemplary embodiment of the present invention will be described with reference to FIG. 10.

Figure 10:
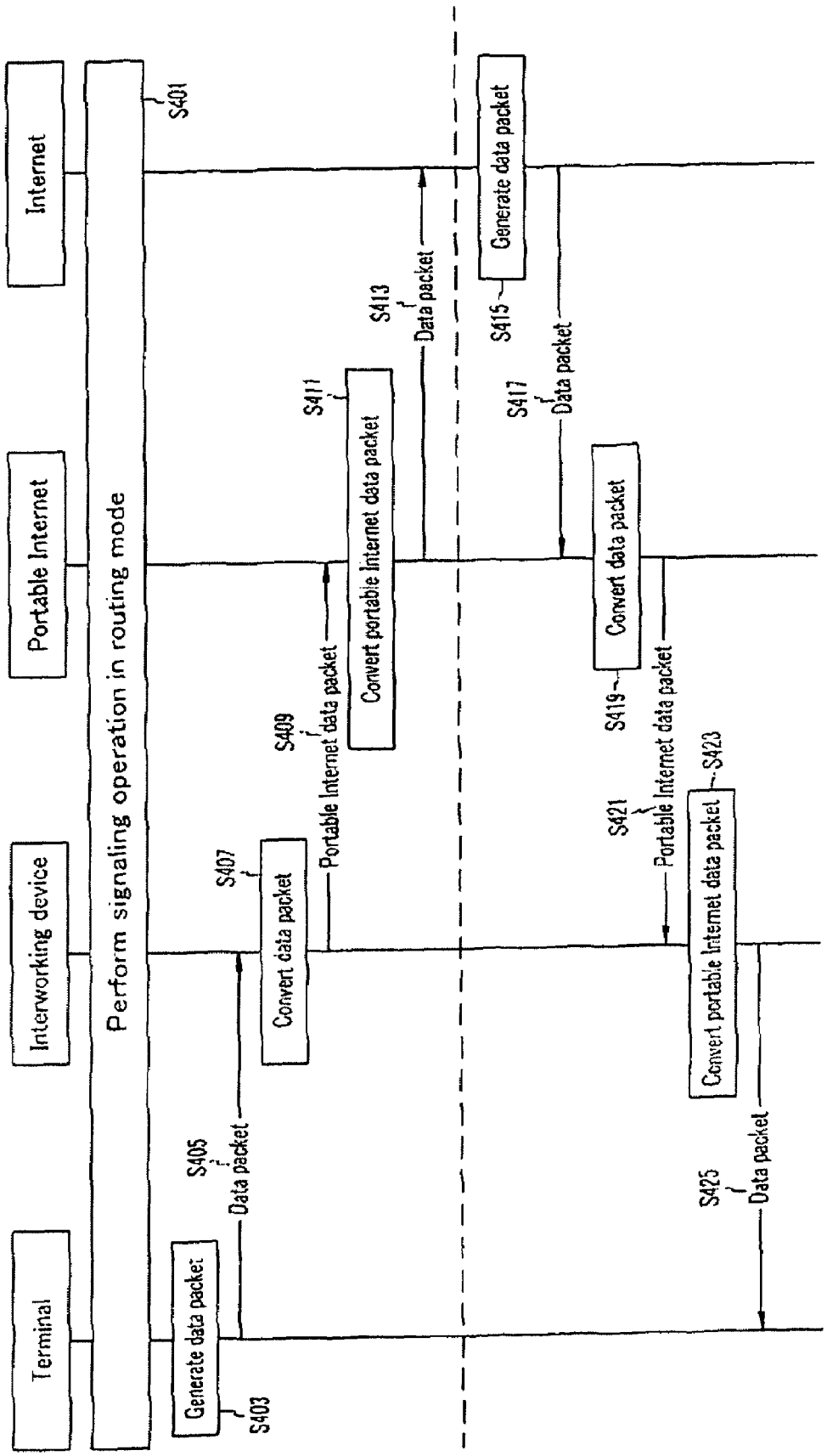
FIG. 10 is a flowchart representing a method for exchanging data in the routing mode by the system including the interworking device according to the exemplary embodiment of the present invention.

FIG. 10 is a flowchart representing the method for exchanging data in the routing mode by the system including the interworking device according to the exemplary embodiment of the present invention.

As shown in FIG. 10, the terminal 500 performs a signaling operation in the routing mode through the system including the interworking device 400 in step S401.

The terminal 500 generates a data packet to be transmitted to the Internet 100 in step S403. The data packet includes the IP address of the Internet 100 and the IP address of the terminal 500. The terminal 500 may determine the destination address of the data packet and may determine the source address as the IP address of the terminal 500.

The terminal 500 transmits the data packet to the interworking device 400 in step S405. The terminal 500 transmits the data packet to the interworking device 400 through the WLAN data path.

The interworking device 400 converts the data packet into a portable Internet data packet in step S407. The interworking unit 450 of the interworking device 400 converts the data packet received by the WLAN matching unit 430 into the portable Internet data packet. In this case, the IP relay 459 of the interworking unit 450 converts the data packet of a WLAN matching unit type into the portable Internet data packet of a portable Internet matching unit type.

The interworking device 400 transmits the portable Internet data packet to the portable Internet 200 in step S409. The interworking unit 450 of the interworking device 400 transmits the portable Internet data packet to the portable Internet 200 through the portable Internet data path. In this case, since the IP relay 459 of the interworking unit 450 transmits the portable Internet data packet through the portable Internet data path, and the portable Internet 200 acknowledges that the portable Internet terminal transmits the portable Internet data packet.

The portable Internet 200 converts the portable Internet data packet into a data packet in step S411. The portable Internet 200 may convert the portable Internet data packet into the data packet to transmit the portable Internet data packet through the IP address of the Internet 100 determined by the destination address of the portable Internet data packet.

The portable Internet 200 transmits the data packet to the Internet 100 in step S413. Accordingly, the Internet 100 receives the data packet transmitted by the terminal 500.

The portable Internet 200 generates the data packet to be transmitted to the terminal 500 in step S415. The data packet includes the IP address of the Internet 100 and the IP address of the terminal 500. The Internet 100 may determine the destination address of the data packet as the IP address of the terminal 500 and may determine the source address as the IP address of the Internet 100.

The Internet 100 transmits the data packet to the portable Internet 200 in step S417.

The portable Internet 200 converts the data packet into a portable Internet data packet in step S419. The portable Internet 200 may convert the data packet into the portable Internet data packet to transmit the data packet through the IP address of the terminal 500 determined by the destination address of the portable Internet data packet through the portable Internet 200.

The portable Internet 200 transmits the portable Internet data packet to the interworking device 400 in step S421. The portable Internet 200 transmits the portable Internet data packet to the portable Internet matching unit 410 of the interworking device 400 through the portable Internet data path.

The interworking device 400 converts the portable Internet data packet into a data packet in step S423. The interworking unit 450 of the interworking device 400 converts the portable Internet data packet received by the portable Internet matching unit 410 into the portable Internet data packet. In this case, the IP relay 459 of the interworking unit 450 converts the portable Internet data packet of the portable Internet matching unit type into the data packet of the WLAN matching unit type.

The interworking device 400 transmits the data packet to the terminal 500 in step S425. The interworking unit 450 of the interworking device 400 transmits the data packet to the terminal 500 through the WLAN data path. Accordingly, the terminal 500 receives the data packet transmitted from the Internet 100.

In this case, the interworking device 400 performs a router function including two interfaces of the portable Internet matching unit 410 and the WLAN matching unit 430. In addition, a function of the interworking unit 450 of the interworking device 400 may vary according to an IP version and an IP address type applied to the two interfaces of the interworking device 400. The interworking unit 450 performs an IP router function when the Internet 100 and the portable Internet 200 use IPv4 and the Internet 100 uses a registered IP address, and the interworking unit 450 performs a network address translation (NAT) function when the Internet 100 uses a private IP address. When the Internet 100 and the portable Internet 200 uses IPv6, the interworking unit 450 performs an IPv6 router function. When the Internet 100 uses IPv4 and the portable Internet 200 uses IPv6 or the Internet 100 uses IPv6 and the portable Internet 200 uses IPv4, the interworking unit 450 may perform an IPv4 to IPv6 converter function.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the exemplary embodiment of the present invention, the WLAN terminal may receive a WLAN service by accessing the WLAN AP without any changes, and it may receive an Internet service in a moving state by using mobility of the portable Internet.

What is claimed is:

1. A method for an interworking device to interwork with a first network to exchange data between a second network and a terminal device, the method comprising:

establishing, with the first network, a first wireless data path that follows a first wireless communication protocol;

receiving a first network address, allocated to the interworking device by an address allocation server of the first network, from the address allocation server of the first network through the first wireless data path;

establishing a second wireless data path that follows a second wireless communication protocol with the terminal device;

receiving a second network address, allocated to the terminal by an address allocation server of the second network, from the address allocation server of the second network through the first wireless data path;

transmitting the second network address to the terminal device through the second wireless data path;

receiving a third network address, allocated to the interworking device by the address allocation server of the second network, from the address allocation server of the second network through the first wireless data path, wherein the third network address is distinct from the first network address; and exchanging the data for the terminal with the second network via the first wireless data path.

2. The method of claim 1, wherein the first wireless communication protocol supports a handover operation, and the second wireless communication protocol does not support a handover operation.

3. The method of claim 2, wherein the exchanging the data comprises:
- receiving a first data packet that follows the second wireless communication protocol from the terminal device through the second wireless data path;
- converting the first data packet into a second data packet that follows the first wireless communication protocol; and
- transmitting the second data packet to the first network through the first wireless data path so that the first network transmits the second data packet to the second network.

4. The method of claim 3, wherein the first data packet includes network address information of the second network that corresponds to a destination address of the first data packet, and
- wherein the transmitting the second data packet to the first network through the first wireless data path includes transmitting the second data packet to the first network according to a network address of a device of the first network.

5. The method of claim 2, wherein the exchanging the data comprises:
- receiving a first data packet that follows the first wireless communication protocol from the first network through the first wireless data path;
- converting the first data packet into a second data packet that follows the second wireless communication protocol; and
- transmitting the second data packet to the terminal device through the second wireless data path.

6. The method of claim 5, wherein the first data packet includes the second network address corresponding to a destination address of the first data packet, and the second data packet is transmitted to the terminal device through the second wireless data path according to the second network address.

7. The method of claim 1, wherein the address allocation servers of the first and second networks are distinct address allocation servers.

* * * * *